United States Patent [19]

Horn et al.

[11] 3,945,969

[45] Mar. 23, 1976

[54] CONTINUOUS PRODUCTION OF POLYCARBONATES

[75] Inventors: Peter Horn, Ludwigshafen; Heribert Kuerten, Mannheim, both of Germany

[73] Assignee: BASF Aktiengesellschaft, Ludwigshafen (Rhine), Germany

[22] Filed: Feb. 1, 1974

[21] Appl. No.: 438,753

[30] Foreign Application Priority Data

Feb. 2, 1973 Germany................................ 2305144

[52] U.S. Cl. ................................ 260/47 XA; 260/49
[51] Int. Cl.² .......................................... C08G 63/62
[58] Field of Search............. 260/47 XA, 77.5 D, 49

[56] References Cited
UNITED STATES PATENTS

| 3,530,094 | 9/1970 | Schnell et al. .................. 260/47 XA |
| 3,674,740 | 7/1972 | Vernaleken et al............. 260/47 XA |
| 3,787,359 | 2/1974 | Horn et al...................... 260/47 XA |

*Primary Examiner*—Wilbert J. Briggs, Sr.
*Attorney, Agent, or Firm*—Johnston, Keil, Thompson & Shurtleff

[57] ABSTRACT

High molecular weight linear polycarbonates are prepared by continuous condensation of organic dihydroxy compounds and phosgene in two reaction zones, a mixture of an aqueous-alkaline solution of the organic dihydroxy compound and an aqueous catalyst solution being introduced at the rate of from 1 to 50 meters per second and the phosgene at the rate of from 30 to 300 meters per second into the first reaction zone and condensed, an organic solvent being incorporated into the resultant reaction mixture containing oligomer and polycarbonate and the condensation of the aqueous-organic reaction mixture carried to completion in the second reaction zone by the two-phase interfacial method.

18 Claims, 1 Drawing Figure

U.S. Patent  March 23, 1976  3,945,969
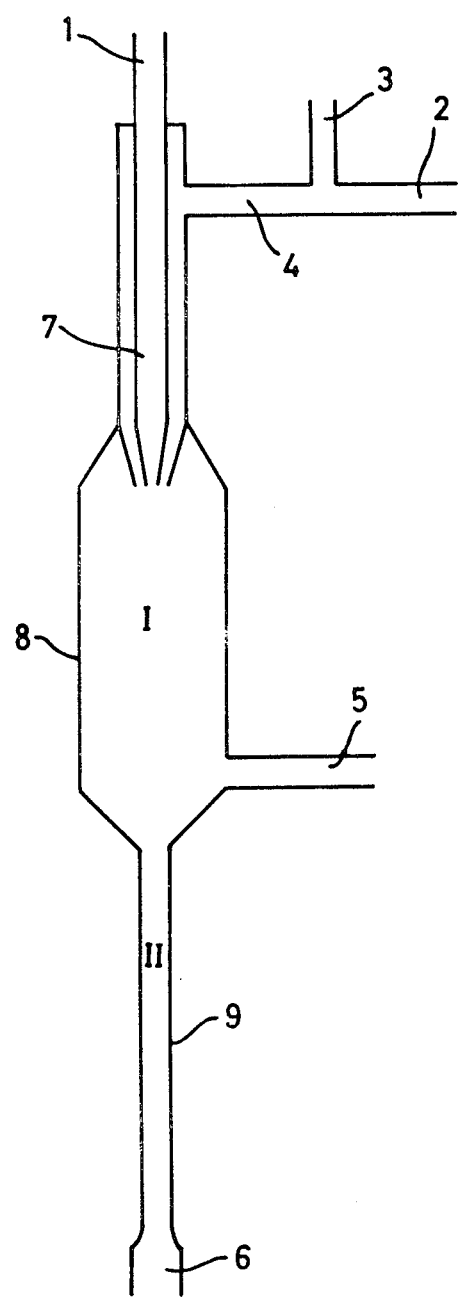

CONTINUOUS PRODUCTION OF POLYCARBONATES

The invention relates to a process for the production of high molecular weight linear polycarbonates from organic dihydroxy compounds and phosgene in reaction zones in which the reactants are introduced at high speed through a first mixing and reaction zone, condensed in a predominantly aqueous solution, the reaction mixture containing oligomers and polycarbonates are mixed with an organic solvent and the condensation of the aqueous organic reaction mixture is carried to completion by the two-phase interfacial method in a second reaction zone.

It is known that high molecular weight linear polycarbonates can be prepared by reaction of aromatic dihydroxy compounds or mixtures of aromatic and cycloaliphatic or aliphatic dihydroxy compounds in the presence of organic monohydroxy compounds as chain stoppers in aqueous-alkaline solution with phosgene and/or esters of bischlorocarbonic acid in inert organic solution by the two-phase interfacial method with the addition of tertiary amines or salts thereof as catalysts. This method, which is not entirely satisfactory industrially, gives polycarbonates which tend to discolor in thermoplastic processing and whose properties are subject to variation.

The continuous production of polycarbonates from the said starting compounds in a plurality of successive reactors, for example a cascade of stirred vessels, is also not new. Although the process gives products of consistent quality, it has the disadvantage of unsatisfactory space-time yields due to residence times of from twenty minutes to four hours and the fairly high expenditure for apparatus necessary for removing the heat of reaction which is evolved. Furthermore alkali metal hydroxide has to be supplied continuously to the reaction mixture because the condensation only takes place satisfactorily in a very narrow pH range.

It has also been proposed to prepare polycarbonate oligomers and high molecular weight polycarbonates in a packed column. Since it is difficult to remove the heat of reaction in this method it is not possible to set up a stationary equilibrium in the column. The result of this is that the starting materials are not reacted quantitatively and the polycondensates can only be reproduced with difficulty. Furthermore the end products contain hydrolyzable chlorine.

Production of high molecular weight polycarbonates in a reaction tube having a succession of dwell zones of greater tube width and mixing zones of smaller tube width, the mixing zones ensuring Reynolds' numbers of more than 100, is also known. The process has the disadvantage that monomeric starting materials cannot be used for the production of the polycarbonates, but only oligomeric polycarbonates.

The invention has for its object to prepare high molecular weight practically chlorine-free linear polycarbonates reproducibly by means of a simple method in high space-time yields.

This object is achieved by a process for the production of high molecular weight linear polycarbonates by reaction of an organic dihydroxy compound with phosgene in the presence of an amine or a salt thereof which consists in carrying out the reaction in a plurality of reaction zones, a mixture of an aqueous-alkaline solution of the organic dihydroxy compound and an aqueous solution of the amine or amine salt being introduced and condensed at the rate of from 1 to 50 meters per second and the phosgene at the rate of from 30 to 300 meters per second through a first mixing and reaction zone, an organic solvent being incorporated into the mainly aqueous reaction solution containing polycarbonate oligomers and polycarbonate at another point in the first mixing and reaction zone and the condensation of the aqueous-organic reaction mixture being carried to completion in a second reaction zone by the two-phase interfacial method.

The new process has the advantage that in the case of complete conversion of the starting materials at residence times of from a fraction of a second to a few minutes, for example from 0.1 second to 5 minutes, practically chlorine-free high molecular weight polycarbonates can be obtained in high space-time yields.

Conventional dihydroxy compounds, for example those specified in German Patent 1,300,266 may be used for the production of polycarbonates by the process of the invention.

Suitable dihydroxy compounds have the formula HO—R—OH in which R is for example a divalent aromatic radical consisting of one or more than one aromatic nucleus of from six to eighteen carbon atoms which may be united direct or optionally by way of divalent bridging members such as —S—, —SO$_2$—, —O—, —CO—, —CH$_2$—,

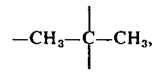

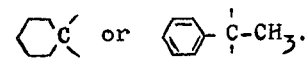

The dihydroxy compounds may be used singly or as mixtures.

Examples of such aromatic compounds are:
hydroquinone, resorcinol, pyrocatechol, 1,2-dihydroxynaphthalene, 1,4-dihydroxynaphthalene, 1,5-dihydroxynaphthalene, 4,4'-dihydroxydiphenyl, 2,2'-dihydroxydiphenyl, 4,4'-dihydroxydiphenyl sulfide, 4,4'dihydroxydiphenyl sulfoxide, 2,2'-dihydroxydiphenylsulfone, 4,4'-dihydroxydiphenylsulfone, 4,4'-dihydroxydiphenyl ether, 4,4'-dihydroxybenzophenone, 1,1-(4,4'-dihydroxydiphenyl)-1-phenylethane and 1,1-(4,4'-dihydroxydiphenyl)-cyclohexane. It is preferred however to use 4,4'-dihydroxydiphenylmethane or 2,2-(4,4'-dihydroxydiphenyl)-propane.

The other starting material is phosgene. Gaseous phosgene may be used as such or diluted with inert gas such as nitrogen, helium or carbon monoxide. It is also possible to use crude phosgene containing carbon monoxide.

Alkali metal hydroxides and preferably sodium hydroxide or potassium hydroxide are suitable as inorganic bases.

Aliphatic hydrocarbons of one to three carbon atoms and containing chlorine such as methylene chloride chloroform, ethylene chloride and propylene chloride and unsubstituted or substituted aromatic hydrocarbons of six to eight carbon atoms such as benzene, toluene, xylene and chlorobenzene have proved to be suitable as inert organic solvents. The solvents may be used alone or mixed together. The amount of solvent is conveniently such that (a) the volumetric ratio of the liquid aqueous reaction solution to the organic solvent is from 1:0.3 to 1:2, preferably from 1:0.4 to 1:1 and particularly about 1:0.5 and (b) the reaction mixture has a solids content of from 3 to 30% by weight and preferably from 15 to 25% by weight based on the total weight of the reaction mixture.

Amines are suitable as catalysts. Examples of suitable amines are tertiary amines such as trimethylamine, triethylamine, tripropylamine, tributylamine, N,N-dimethylcyclohexylamine, N,N-diethylcyclohexylamine, N,N-dimethylaniline, pyridine, picoline, quinoline, N-alkylmorpholines or salts of the same.

The reaction is conveniently carried out at temperatures of from 25° to 90°C and preferably at from 35° to 50°C and at a pH of the reaction solution of from 8 to 13.5 and preferably of from 8.5 to 10.5.

The starting material (i.e. the mixture of the aqueous-alkaline solution of the organic dihydroxy compound and the aqueous solution of the amine or amine salt and the gaseous phosgene) is introduced into the reaction zone through a multicomponent nozzle at high speed and at a pressure of from 1.1 to 13 bar and preferably of from 1.5 to 4.5 bar in the pipeline, so that according to the laws of jet blending a very rapid and intense mixing of phosgene and the aqueous mixture is achieved. To achieve optimal reaction rates it is essential that the mixture of the components dissolved in water should have a speed of from 1 meter per second to 50 meters per second and preferably from 3 to 30 meters per second and the phosgene should have a speed of from 30 to 300 meters per second and preferably from 50 to 200 meters per second. The first mixing and reaction zone has a mean diameter which is from three to thirty times and preferably from 10 to 25 times the means diameter of the entering stream of starting material. The mean diameter of the stream is the diameter of a circle of equal area which is determined from the cross-sectional area of the inlet openings, for example annular or slot nozzles, of the mixing zone. The first reaction zone may have a cross-section which is constant or which varies in the direction of flow. The mixing and reaction zone may be of different shapes, the shape conveniently being adapted to the type of nozzle used. Generally conic sections or preferably cylindrical tubes are used. When the first mixing and reaction zone is formed as a cylindrical tube its length should be from once to 20 times and preferably from 1.5 to five times its diameter. When the first mixing and reaction zone is not circular or does not have a constant cross-section throughout its length its length should be from once to 20 times and preferably from 1.5 to five times the hydraulic diameter. The hydraulic diameter is the diameter of a cylindrical tube which exhibits the same pressure loss as the reaction zone for the same amount passed through it and for the same length.

An organic solvent is incorporated into the mainly aqueous reaction solution containing polycarbonate oligomers and polycarbonates at any point of the first mixing and reaction zone. The inlet orifice for the organic solvent is conveniently located in the half of the first mixing and reaction zone further removed from the multicomponent nozzle or immediately prior to the point of transition into the second reaction zone. In this way it is ensured that condensation between the organic dihydroxy compound and phosgene takes place in the presence of the amine or amine salt mainly in aqueous alkaline solution and backmixing of organic solvent containing polycarbonate oligomers or polycarbonate with the aqueous-alkaline solution takes place only to a trivial extent if at all, depending on the shape of the first mixing and reaction zone.

Since there is practically no dilution of the aqueous-alkaline reaction medium in the first mixing and reaction zone with the organic solvent it is possible to prepare high molecular weight linear polycarbonates at elevated reaction temperatures in concentrated aqueous solutions in a manner which can be easily reproduced. Some of the organic solvent is evaporated at the interface between aqueous reaction solution and organic solvent by the high reaction temperatures so that excess pressure is set up in the first reaction zone and this additionally increases the reaction speed and consequently the space-time yield.

The first mixing and reaction zone is followed by a second reaction zone which in the simplest case consists of a cylindrical tube. The ratio of length to diameter in the second reaction zone is from 5:1 to 40:1 and preferably from 10:1 to 30:1. Moreover the second reaction zone exhibits a dissipation density of from 10 to $3 \times 10^4$ KW/m$^3$ and preferably of from $10^2$ to $10^4$ KW/m$^3$. The condensation of the aqueous-organic reaction mixture according to the two-phase interfacial method is carried to completion in this reaction zone.

The reaction mixture containing polycarbonate prepared by this method and which has a solids content of up to 30% by weight based on the total weight of reaction mixture and a reaction temperature of preferably more than 35°C is then cooled if necessary to a temperature of from 20° to 35°C and processed by conventional purification methods.

Purification may be carried out for example in a reactor containing tower packing, for example a packed column. The reaction mixture containing polycarbonate and hydrogen chloride are supplied, if desired diluted with inert gas, conveniently to the top end of a packed column in such an amount that the excess alkali hydroxide and the alkali metal carbonate and/or bicarbonate formed are converted into alkali metal chloride while flowing through the packing. The aqueous solution containing electrolyte and the organic polycarbonate solution are then separated by means of separating means, for example a liquid centrifuge. The organic polycarbonate solution is washed free from electrolyte, for example with water of condensation, and isolated again in one or more further separators.

Specifically the linear high molecular weight polycarbonates are conveniently prepared by condensing 1 mole of the organic dihydroxy compound dissolved in 1900 to 2200 g and preferably 1980 to 2100 g of from 1.2 to 2.0 M and preferably from 1.4 to 1.8 M aqueous alkali metal hydroxide solution with from 0.9 to 1.5 M and preferably from 1 to 1.3 M and particularly from 1.1 to 1.2 M of phosgene in the presence of from 0.001 to 0.3 mole and preferably from 0.05 to 0.2 mole of a tertiary amine or salt thereof in aqueous solution, then incorporating into the aqueous reaction solution containing carbonate oligomers and polycarbonate such an amount of an organic solvent that the ratio by volume of the liquid aqueous phase to the liquid organic phase is from 1:0.3 to 1:2, preferably from 1:0.4 to 1:1 and particularly about 1:0.5 and carrying the condensation of the aqueous-organic reaction mixture to completion by the two-phase interfacial method.

A preferred embodiment of the process of the invention will now be descirbed with reference to the drawing. In the drawing:

I is the first mixing zone and reaction zone;
II is the second reaction zone;
1 is the feedpipe for phosgene;
2 is the feedpipe for the aqueous-alkaline solution of the organic dihydroxy compound;
3 is the feedpipe for the aqueous solution of the amine or amine salt;
4 is the feedpipe for the mixture from 2 and 3;
5 is the feedpipe for organic solvent;
6 is the discharge pipe for the reaction product;
7 is a two-component nozzle;
8 is the reaction vessel; and
9 is the reaction tube.

Phosgene is supplied through feedpipe 1 to reaction vessel 8 through two-component nozzle 7. The aqueous-alkaline solution of the organic dihydroxy compound and the aqueous solution of the amine or amine salt are supplied through lines 2, 3 and 4 and the mixture of the said starting components through the two-component nozzle 7 into the same reaction vessel 8. The starting materials are mixed intensely in the mixing and reaction zone I and condensed in mainly aqueous-alkaline solution. An organic solvent in which the polycondensates are soluble is supplied through line 5 to the aqueous-alkaline reaction solution containing polycarbonate oligomers and polycarbonate and the aqueous-organic reaction mixture is transferred to reaction tube 2. The condensation is here carried to completion in the second reaction zone II by the two-phase interfacial method. The reaction mixture containing polycarbonate is removed through discharge pipe 6 from the reaction tube.

Polycarbonates prepared by the process according to the invention have K values of from 49 to 60 (measured in methylene chloride at 0.5% by weight strength at 25°C) and contain practically no hydrolyzable chlorine.

The polycarbonates are suitable for the production of valuable moldings or coatings; they may be shaped under pressure, extruded or processed by injection molding or flame spraying methods. Film, sheeting and fibers may be prepared from the products and these may be oriented by stretching. The strength of the products is greatly improved by stretching. The polycarbonates may be processed into moldings with plasticizers or fillers such as glass fibers.

The process is illustrated in greater detail by the following Example. The K values given have been determined by the method of H. Fikentscher (Cellulosechemie, 13 (1932), 58). The parts specified in the Example are parts by weight. Parts by volume bear the same relation to parts by weight as the liter to the kilogram.

EXAMPLE

The reaction is carried out in a glass apparatus consisting of a two-component nozzle, a tubular reactor having an internal diameter of 20 mm and a length of 50 mm and a reaction tube having an internal diameter of 4 mm and a length of 100 mm. At one end of the tubular reactor phosgene and the mixture of the alkaline-aqueous solution of the organic dihydroxy compound and the aqueous solution of the amine or amine salt are introduced by means of a two-component nozzle consisting of the phosgene nozzle having an internal diameter of 1 mm and a wall thickness of 0.35 mm and a liquid annular nozzle surrounding the phosgene nozzle coaxially and having an internal diameter of 2.5 mm. 35 mm from the nozzle opening there is located on the wall of the tubular reactor the feed for the organic solvent. At the other end of the tubular reactor the reaction tube is coaxially located and this opens into the outlet for the reaction mixture containing polycarbonate. The internal diameter of the inlet and outlet pipes is 10 mm.

The tubular reactor 8 has supplied to it by way of line 1 through the phosgene nozzle at the rate of 100 meters per second 1,679 kg of gaseous phosgene (380,000 ml) per hour at a pressure of 1.95 bar. A mixture of 28,000 ml of an aqueous alkaline 2,2-(4,4'-dihydroxydiphenyl)-propane solution (consisting of 10,960 parts of 2,2-(4,4'-dihydroxydiphenyl)-propane, 10.96 parts of sodium sulfite and 89,200 parts by volume of 1.6 M aqueous sodium hydroxide solution and 2000 ml of 8.6% by weight aqueous triethylamine solution per hour at the rate of 3 meters per second and at a temperature of 5°C is metered into the tubular reactor 8 through lines 2 and 3 or 4 through the liquid annular nozzle. The pressure in line 2 is 2.3 bar and in line 3 is 2 bar. The reaction temperature in the tubular reactor 8 is 45°C. 14,000 ml of methylene chloride is incorporated per hour into the aqueous reaction solution at atmospheric pressure in the tubular reactor 8 through line 5. Condensation of the aqueous-organic reaction mixture is carried to completion at a temperature of 44°C in the second reaction zone in the reaction tube. The polycarbonate-containing reaction mixture (having a solids content of 21.5% by weight) is cooled to 28°C by means of a Liebig condenser, neutralized with dilute hydrochloric acid, the organic phase is separated from the aqueous phase, the organic phase is washed with water until devoid of electrolyte and the solvent is distilled off.

A polycarbonate having a K value of 59 (measured 0.5% by weight in methylene chloride) is obtained; it does not contain any hydrolyzable chlorine. The conversion is 100% based on 2,2-(4,4'-dihydroxydiphenyl)-propane.

Test specimens prepared by injection molding have a notched impact strength according to German Industrial Standard DIN 53,453 of more than 30.

We claim:

1. A process for the continuous production of a high molecular weight polycarbonate by reaction of an organic dihydroxy compound selected from the group consisting of hydroquinone, resorcinol, pyrocatechol, 1,2-dihydroxynaphthalene, 1,4-dihydroxynaphthalene, 1,5-dihydroxynaphthalene, 4,4'-dihydroxydiphenyl, 2,2'-dihydroxydiphenyl, 4,4'-dihydroxydiphenyl sulfide, 4,4'-dihydroxydiphenyl sulfoxide, 2,2'-dihydroxydiphenylsulfone, 4,4'-dihydroxydiphenyl-sulfone, 4,4'-dihydroxydiphenyl ether, 4,4'-dihydroxybenzophenone, 1,1-(4,4'-dihydroxydiphenyl)-1-phenylethane, 1,1-(4,4'-dihydroxydiphenyl)-cyclohexane, 4,4'-dihydroxydiphenylmethane and 2,2-(4,4'-dihydroxydiphenyl)-propane with phosgene in the presence of an amine or a salt of the same wherein the reaction is carried out in a plurality of reaction zones, a mixture of an aqueous-alkaline solution (a) of the organic compound and an aqueous solution of the amine or amine salt being introduced at the rate of from 1 to 50 meters per second and the phosgene (b) at the rate of from 30 to 300 meters per second in a first mixing and reaction zone, and condensed in said first mixing and reaction zone in a mainly aqueous alkaline solution to polycarbonate oligomers or polycarbonate, an organic solvent being introduced into said first mixing and reaction zone and incorporated into the mainly aqueous solution containing polycarbonate oligomers and polycarbonate at a point located in half removed from the inlet orifice for the aqueous-alkaline solution (a) and phosgene (b) or adjacent to the point of transition into the second reaction zone in such a way that back-mixing of the organic solvent containing polycarbonate oligomers or polycarbonate with the aqueous solution does not take place or only takes place to a trivial extent, and the condensation of the aqueous organic reaction mixture being carried to completion in a second reaction zone by the two-phase interfacial method.

2. A process for the continuous production of a high molecular weight polycarbonate as claimed in claim 1 wherein the first mixing and reaction zone has an internal diameter which is from three to thirty times the means internal diameter of the stream of reactants supplied and the length of the mixing and reaction zone is from once to 20 times its diameter.

3. A process for the continuous production of high molecular weight polycarbonates as claimed in claim 1 wherein the second reaction zone has a dissipation density of from 10 to $3 \times 10^4$ KW/m$^3$ and the ratio of the length to the diameter in the second reaction zone is from 5:1 to 40:1.

4. A process as claimed in claim 1 wherein the organic dihydroxy compound used is 4,4'-dihydroxydiphenylmethane or 2,2-(4,4'-dihydroxydiphenyl)-propane.

5. A process as claimed in claim 1 wherein the amount of solvent is such that the volumetric ratio of liquid aqueous reaction solution to organic solvent is from 1:0.3 to 1:2 and the reaction mixture thereafter has a solids content of from 3 to 20% by weight based on the total weight of the reaction mixture.

6. A process as claimed in claim 5 wherein the said ratio is from 1:0.4 to 1:1.

7. A process as claimed in claim 5 wherein the said ratio is about 1:0.5.

8. A process as claimed in claim 5 wherein the solids content is from 15 to 25% by weight.

9. A process as claimed in claim 1 carried out at a temperature of from 25° to 90°C.

10. A process as claimed in claim 1 carried out at a temperature of from 35° to 50°C.

11. A process as claimed in claim 1 carried out at a pH of the reaction solution of from 8 to 13.5.

12. A process as claimed in claim 1 carried out at a pH of the reaction solution of from 8.5 to 10.5.

13. A process as claimed in claim 1 wherein the reaction solution is introduced at a speed of from 3 to 30 meters per second.

14. A process as claimed in claim 1 wherein the phosgene is introduced at a speed of from 5 to 200 meters per second.

15. A process as claimed in claim 1 wherein the first mixing and reaction zone has a mean internal diameter which is from 10 to 25 times the mean internal diameter of the stream of reactants supplied.

16. A process as claimed in claim 1 wherein the length of the mixing and reaction zone is from one and one half to five times its diameter.

17. A process as claimed in claim 1 wherein the first mixing and reaction zone is not circular and/or does not have constant cross-section throughout and its length is from once to 20 times its hydraulic diameter, as herein defined.

18. A process as claimed in claim 17 wherein the length of the first mixing and reaction zone is from one and one half to five times its hydraulic diameter.

* * * * *

UNITED STATES PATENT AND TRADEMARK OFFICE
CERTIFICATE OF CORRECTION

PATENT NO. : 3,945,969
DATED : March 23, 1976
INVENTOR(S) : HORN et al

It is certified that error appears in the above-identified patent and that said Letters Patent are hereby corrected as shown below:

In Column 7, Line 19, delete " means internal diameter " and substitute -- mean internal diameter --

Signed and Sealed this

Sixteenth Day of November 1976

[SEAL]

Attest:

RUTH C. MASON
*Attesting Officer*

C. MARSHALL DANN
*Commissioner of Patents and Trademarks*